United States Patent Office 3,632,665
Patented Jan. 4, 1972

3,632,665
HARDENABLE REACTION PRODUCTS BASED ON TRIGLYCIDYL ISOCYANURATE
Zissis Aggias, Hilden, Rhineland, Germany, assignor to Henkel & Cie G.m.b.H., Dusseldorf-Holthausen, Germany
No Drawing. Filed Sept. 10, 1968, Ser. No. 758,665
Claims priority, application Germany, Sept. 30, 1967, H 64,043
Int. Cl. C08g 30/14, 3/00, 45/12
U.S. Cl. 260—830      5 Claims

ABSTRACT OF THE DISCLOSURE

The present invention relates to a resinous reaction product based on triglycidyl isocyanurate which comprises a reaction product of a reaction effected at temperatures above the melting point, of crystalline triglycidyl isocyanurate having an epoxide oxygen content of at least 14% with (a) an organic compound containing more than one isocyanate group in the molecule and free of other epoxide reacting substitutents, in such a ratio that from about 1 to 15 parts by weight of isocyanate groups in said organic compound are allotted to 100 parts by weight of said crystalline triglycidyl isocyanurate and (b) a compound capable of forming polyadducts with epoxide compounds and free of isocyanate groups in such a ratio that the said reaction product contains from about 4% to 11% by weight of epoxide oxygen. The said resinous reaction product is soluble in the customary organic solvents and when admixed with customary epoxide resin hardeners, is heat hardenable. It is useful in the preparation of laminated molded plastics, lacquers, casting resins and adhesives.

THE PRIOR ART

It is known how to prepare mixtures from crystalline triglycidyl isocyanurate which has a high content of epoxide oxygen, and organic compounds which are capable of forming polyadducts with epoxide compounds, which mixtures can be worked into casting resins and which at a high temperature harden to synthetic resins with a high heat deformation resistance. If it is tried to prepare solutions from such mixtures and, for instance, to impregnate fabrics with them with the intention of preparing laminated plastics, difficulties occur which are due to the limited solubility of pure triglycidyl isocyanurate. Since, with a single impregnation, a sufficient deposit of hardenable mixture cannot be obtained, the impregnation must be repeated. Therefore, the preparation of impregnated fibrous mats becomes too expensive. Furthermore, difficulties also occur in the preparation of solutions which can be used as coating agents, due to the limited solubility of triglycidyl isocyanurate. In addition, the relatively high working temperature required for hardening mixtures of casting resins based on triglycidyl isocyanurate often is a disadvantage for this starting material which otherwise gives molded bodies with excellent thermal and electrical properties.

OBJECTS OF THE INVENTION

An object of the present invention is to modify crystalline triglycidyl isocyanurate in such a manner that the resultant modified resinous reaction product is easily soluble in solvents and hardenable at relatively low temperatures, while retaining in hardened form, all the other good properties of hardened triglycidyl isocyanurate.

Another object of the invention is the obtention of a resinous reaction product based on triglycidyl isocyanurate which comprises a reaction product of a reaction effected at temperatures above the melting point, of crystalline triglycidyl isocyanurate having an epoxide oxygen content of at least 14% with (a) an organic compound containing more than one isocyanate group in the molecule and free of other epoxide reacting substituents in such a ratio that from about 1 to 15 parts by weight of isocyanate groups in said organic compound are allotted to 100 parts by weight of said crystalline triglycidyl isocyanurate and (b) a compound capable of forming polyadducts with epoxide compounds and free of isocyanate groups in such a ratio that the said reaction product contains from about 4% to 11% by weight of epoxide oxygen.

A further object of the invention is the development of a process for the obtention of the above resinous reaction product.

A yet further object of the invention is the obtention of a hardened epoxide resin based on triglycidyl isocyanurate having the good physical properties of hardened triglycidyl isocyanurate without requirement of high curing temperatures by the reaction of the above resinous reaction product with an epoxide resin hardener.

These and other objects of the invention will become more apparent as the description thereof proceeds.

DESCRIPTION OF THE INVENTION

These objects have been achieved in the development of hardenable resinous reaction products based on triglycidyl isocyanurate which dissolve easily in solvents and which produce concentrated enough solutions in order to make possible an economical preparation of lacquer solvents, prepregs and the like. This hardenable product of the invention is a resinous reaction product based on triglycidyl isocyanurate which comprises a reaction product of a reaction effected at temperatures above the melting point, of crystalline triglycidyl isocyanurate having an epoxide oxygen content of at least 14% with (a) an organic compound containing more than one isocyanate group in the molecule and free of other epoxide reacting substituents in such a raio that from about 1 to 15 parts by weight of isocyanate groups in said organic compound are alloted to 100 parts by weight of said crystalline triglycidyl isocyanurate and (b) a compound capable of forming polyadducts with epoxide compounds and free of isocyanate groups in such a ratio that the said reaction product contains from about 4% to 11% by weight of epoxide oxygen.

This resinous reaction product according to the invention is obtained by reacting crystalline triglycidyl isocyanurate having an epoxide oxygen content of at least 14% with (a) an organic compound containing more than one isocyanate group in the molecule and free of other epoxide reacting substituents in such a ratio that from about 1 to 15 parts by weight of isocyanate groups in the organic compound are allotted to 100 parts by weight of triglycidyl isocyanurate, and (b) with such amounts of a compound capable of forming polyadducts with epoxide compounds, such that the obtained reaction product still contains about 4% to 11% by weight of epoxide oxygen. Preferably, the crystalline triglycidyl isocyanurate is reacted first with the compounds named under (a) and then with the compounds named under (b).

The crystalline triglycidyl isocyanurate, to be used according to the practice of the invention, should have an epoxide oxygen content of at least 14%. The preparation of crystalline triglycidyl isocyanurate is known as such and described in U.S. Pat. No. 3,337,509, dated Aug. 22, 1967. This preparation can be accomplished by purifying crude reaction products, which are obtained, for example, by reacting cyanuric acid with an excess of epichlorohydrin. Crystalline triglycidyl isocyanurate with the required epoxide content can be obtained by a single or by repeated recrystallizations from suitable solvents, such as methanol. Suitable as organic compounds containing more than one isocyanate group in the molecule and free of other epoxide reacting substituents are the known polyvalent isocyanates, as are employed in the preparation of polyurethanes such as, for instance, the alkylphenylene diisocyanates such as toluylene diisocyanate, the naphthylene diisocyanates such as naphthylene-1,5-diisocyanate, bis-(isocyanato-methyl)-benzene, the alkylene diisocyanates such as hexamethylene diisocyanate, the addition products of the above diisocyanates on glycols such as the addition product of toluylene diisocyanate with decamethyleneglycol in the mol ratio of 2 to 1.

Preferred are higher molecular weight organic compounds containing more than one isocyanate group in the molecule with a molecular weight of about 800 to 3000. Such isocyanates are known per se and can be obtained, for example, through the reaction of high molecular weight organic compounds having more than one terminal hydroxyl group with polyvalent, in particular, bivalent isocyanates. Suitable as such compounds are polyethers having more than one terminal hydroxyl group, for instance, polyglycols, such as polyethylene glycols, polypropylene glycols and polybutylene glycols having molecular weights of from about 800 to 3000. Furthermore, castor oil or polybutadienes having hydroxyl groups can be employed as the compounds containing hydroxyl groups. In addition to the above-indicated compounds containing hydroxyl groups, polyesters can be employed which are prepared in the known way from organic dicarboxylic acids and dihydric alcohols by means of esterification. Suitable polyesters can, for instance, be prepared from alkanedioic acids such as adipic acid, succinic acid, sebacic acid; benzene dicarboxylic acids such as phthalic acid, terephthalic acid; cycloalkane dicarboxylic acids such as hexahydroterephthalic acid; alkenedioic acids such as maleic acid, furmaric acid; reacted with alkanediols such as ethylene glycol, propylene glycol, heptanediol; alkoxyalkanediols such as diethylene glycol; thiodiglycol, etc. Other suitable compounds are, for instance, polyesters prepared from lactones such as caprolactone. Finally, long-chained polyhydric alcohols can be employed successfully as compounds containing hydroxyl groups such as dimerized or trimerized higher fatty alcohols.

The conversion of these compounds containing hydroxyl groups into higher molecular weight organic compounds containing more than one isocyanate group in the molecule is carried out in the common way with lower molecular weight polyvalent isocyanates such as toluylene diisocyanate, diphenylmethane diisocyanate, dianisidine diisocyanate, naphthalene-1,5-diisocyanate, hexamethylene diisocyanate, dodecane diisocyanate, dicyclohexylmethane-4,4'-diisocyanate and others.

Such compounds containing isocyanate groups, which are preparable in the above-described way, are known as so-called "prepolymers" for the prepaartion of polyurethane plastics. For the reaction of the invention, the isocyanate groups in these compounds may be present in the free form or they may be blocked in the known way.

The amount of those organic compounds containing more than one isocyanate group in the molecule and free of other epoxide reacting substituents is calculated in such a way that, in general, about 1 to 15 parts by weight of isocyanate groups in said organic compounds are allotted to 100 parts by weight of triglycidyl isocyanurate. Preferably, however, from 2 to 10 parts by weight of isocyanate groups are employed.

Suitable as compounds which are capable of poly adduct formation with epoxide compounds or epoxide resin hardeners are all those substances which are commonly employed for this purpose. Thus come into consideration, for instance, aromatic, aliphatic and cycloaliphatic amines or polycarboxylic acid anhydrides. Preferred are those aromatic amines or poly carboxylic acid anhydrides which are commonly used for the elevated temperature hardening of epoxide resins. For instance, aromatic diamines such as diaminodiphenylsulfone, the isomeric phenylenediamines, benzidine, 4,4'-diaminodiphenylmethane, 4,4'-diamino-3,3'-dichlorodiphenylmethane, and organic dicarboxylic acid anhydrides such as phthalic acid anhydride, tetrahydrophthalic acid anhydride, hexahydrophthalic acid anhydride, methylhexahydrophthalic acid anhydride, endomethylene-tetrahydrophthalic acid anhydride, dichloromaleic acid anhydride, hexachloroendomethylenetetrahydrophthalic acid anhydride may be employed.

For the carrying out of the process of the invention, for instance, first the crystalline triglycidyl isocyanurate and the organic compound containing more than one isocyanate group are melted. Then they are reacted at temperatures between 80° C. and 140° C. It is possible to either melt the mixture of the reaction components or to add one of the reaction components to the melt of the other reaction component. The duration of the reaction is dependent upon the temperature and generally lies between about ½ to 3 hours. It is possible and useful to carry out the reaction in inert organic solvents as well. The reaction of the product of the first phase of the process with compounds capable of forming polyadducts with epoxide compounds can be carried out in the melt or possibly in solution. It can be carried out prior to the reaction with the isocyanates. Preferably, however, it is carried out subsequently. The duration of the reaction is dependent upon the temperature and the reactivity of the polyadduct formers and at reaction temperatures of approximately 90° C. to 150° C. the reaction takes between 15 minutes and 1 hour.

The resinous reaction product based on triglycidyl isocyanurate produced as above and containing from about 4% to 11% of epoxide oxygen can be reacted according to known methods to give solid, unmeltable plastics by means of substances which in the literature are described as epoxide resin hardeners. A compilation of suitable epoxide resin hardeners is given in the book of A. M. Paquin "Epoxid-verbindugen und Epoxidharze" (1958), pages 461 to 528. According thereto the products of the invention can be reacted both with catalytically effective hardeners as well as with polyadduct formers such as polycarboxylic acid anhydrides, amines or even polyvalent phenols, formaldehyde condensates, urea resins or melamine resins.

The resinous reaction products containing epoxide groups of the invention are preservable for several months without a detrimental effect thereto. Equally well, mixtures with elevated temperature hardeners can be stored for some length of time. As indicated, these resinous reaction products of the invention are soluble in organic solvents. Suitable as solvents are, for instance, acetone, methylethylketone, dioxane, ethyl acetate, butyl acetate, toluene, chloroform, methylenechloride, trichloroethylene, dimethylsulfoxide, dimethylformamide and others. In these named solvents the products of the invention, possible in admixture with suitable epoxide resin hardeners, will dissolve at 20° C. to 30° C. to give approximately 45% to 65% solutions. With these solutions, fibrous materials, such as glass fiber fabrics or mats of glass fibers in random position or fiber fleeces from spun rock fibers, etc. can be impregnated and, subsequent to the evaporation of the solvent, can be worked into laminated molded plastics.

Moreover, resinous reaction products containing epoxide groups can be employed for the preparation of lacquers. Here, again, common hardeners for epoxide compounds and possibly other adjuvants for the preparation of surface coatings are used as well.

Furthermore, some of the resinous reaction products prepared according to the invention can be subsequently treated as casting resins. In these cases it is useful to add to the mixtures of the resinous reaction products according to the invention and epoxide resin hardeners such as conventional materials as dyestuffs, pigments or fillers such as, for instance, quartz powder, glass powder, ground dolomite, mica, aluminum oxide, titanium oxide, zirconium oxide or even barium sulfate.

Finally, the resinous reaction products of the invention in combination with epoxide resin hardeners can be employed as adhesive substance, for instance, for the joining of metals such as iron, steel, copper, brass or any other rigid bodies of hard plastics or glass, porcelain or ceramics.

It has to be considered as unexpected that readily soluble mixtures are obtained by means of the pre-reactions of the invention between crystalline triglycidyl isocyanurate and compounds containing more than one isocyanate group as well as those compounds which are capable of forming polyadducts with epoxide groups. This improvement in the solubility was not to be expected in view of the relatively poor solubility of triglycidyl isocyanurate and in view of the fact that in the case of other known epoxide resins, generally a deterioration of the solubility occurs if a pre-reaction with a polyadduct former is carried out.

The following examples are illustrative of the practice of the invention. They are not, however, to be construed as limitative of the invention in any manner.

EXAMPLE 1

In a three-necked flask equipped with a stirrer and a thermometer, 100 gm. of triglycidyl isocyanurate were melted. 43 gm. of a diisocyanate (isocyanate content 9.5%) were introduced into the melt within ½ hour. The diisocyanate was prepared from a dimerized fatty alcohol which contained small amounts of trimerized fatty alcohol and which had a molecular weight of 700, through reaction with toluylene diisocyanate, where one mol of toluylene diisocyanate was alloted to each mol of hydroxyl groups in the molecule. The reaction mixture was stirred for one hour at 150° C. Then, 10.5 gm. of 4,4'-diamino-3,3'-dichlorodiphenylmethane were added and the mixture was heated for another hour to 150° C. After cooling, a solid substance at room temperature was obtained, which exhibited an epoxide oxygen content of 7.8%.

EXAMPLE 2

Example 1 was repeated. However, in place of the diisocyanate used therein, a reaction product of polytetrahydrofuran with terminal hydroxyl groups (molecular weight 1000) and toluylene diisocyanate was employed (isocyanate content 6.2%). Here, too, one mol toluylenediisocyanate was employed for each mol of hydroxyl groups in the molecule. A solid substance at room temperature was obtained which exhibited an epoxide oxygen content of 8.3%.

EXAMPLE 3

Example 2 was repeated. However, in place of 4,4'-diamino-3,3'-dichlorodiphenylmethane, the same amount of phthalic acid anhydride was employed. A solid substance at room temperature was obtained, which exhibited an epoxide oxygen content of 8.0%.

Application of the Resinous Reaction Products Containing Epoxide Groups Obtained According to the Invention

EXAMPLE 4

Casting resins

From 100 gm. of the substance prepared according to Example 1, 63 gm. of hexahydrophthalic acid anhydride and 326 gm. of zirconium silicate, a mixture was prepared and melted at 120° C. From this melted mixture molded bodies measuring 10 x 15 x 120 mm. were cast. They were hardened for 4½ hours at 110° C. and for 15 hours at 150° C. (Test A).

In the same way molded bodies were prepared. However, the product according to Example 1 was replaced by the same amount of the product according to Example 2 (Test B), or Example 3 (Test C).

The values of the following measurements are average values and were measured according to the following specifications:

Martens temperature _____ DIN 53,458
Impact strength _____ DIN 53,453
Deflection and flexural strength _____ DIN 53,452
Surface leakage of current _____ DIN 53,480

TABLE I

| Test No. | Martens temp., °C. | Impact strength, kp. cm./cm.² | Deflection, mm. | Flexural strength, kp./cm.² | Surface leakage of current |
|---|---|---|---|---|---|
| A | 195 | 8–9 | 3–4 | 1,200–1,400 | KA 3 c |
| B | 182 | 10–12 | 2 | 1,400–1,500 | KA 3 c |
| C | 173 | 15 | 4 | 1,510 | KA 3 c |

EXAMPLE 5

Laminates 100 gm. of the substance according to Example 1 and 36 gm. of 4,4'-diamino-3,4'-dichlorodiphenylmethane were dissolved under stirring in 91 gm. of dioxane. With this solution glass fiber fabrics were impregnated and subsequent to the drying 20 layers of these "prepregs" were compressed under a pressure of 30 kg./cm.² and a temperature of 160° C. for 15 minutes. From these plates, standard pieces measuring 50 x 6 x 4 mm. were sawed. By means of several tests, the average impact strength was determined. It was 105 kp. cm./cm.² (DIN 53 453).

The tg δ was $5.10^{-3}$ at 20° C., dielectric constant $\epsilon = 3.8$.

EXAMPLE 6

Preparation of a lacquer solution 40 gm. of the product prepared according to Example 1 were dissolved in 60 gm. of dioxane. To this were added different amounts of different amine epoxide resin hardeners. Into the thus obtained lacquer solution, cleaned sheet iron plates measuring 100 x 50 x 4 mm. were immersed and, subsequent to the draining of the excess lacquer solution and after evaporation of the solvent, they were hardened for different periods of time. The average thickness of the lacquer film which adhered to the plates was 25 to 30µ.

In the following Table II, the first column lists the amount and type of amine employed, in the following columns, the time and temperature of the hardening and the Erichsen-depth determined as an average of several samples and finally the grid-cut.

TABLE II

| Amine | Hardening | Erichsen depth, mm. | Grid-cut |
|---|---|---|---|
| 10 gm. of 4,4'-diaminodicyclohexylmethane | 1 hour, 100° C. | 7 | Grade 1. |
| 4 gm. of diethylenetriamine | 7 days, 25° C. | 7 | Grade 1. |
| 18.6 gm. of 4,4'-diaminodiphenylsulfone | 3 hours, 160° C. | 7 | Grade 0–1. |

From 45 gm. of the product prepared according to Example 1 and 15 gm. of a hardenable phenolic resin of the resole type, a solution was prepared by means of heating in a mixture of 70 gm. of xylene and 70 gm. of diacetone alcohol. Into this solution sheet iron plates measuring 100 x 50 x 4 mm. were immersed and, after evaporation of the solvent, the coated plates were tempered for 2 hours at 160° C. A lacquer coat of 15µ thickness was obtained which had an Erichsen-depth of 10 mm. and which had a grid-cut of the Grade 0.

EXAMPLE 7

Fluidization dip coating 100 gm. of the substance according to Example 1 were admixed with 30 gm. of 4,4'-diaminodiphenylsulfone and the mixture was ground for ½ hour. Heated sheet iron plates measuring 100 x 50 x 4 mm. were dipped into a powder bath. The immersion temperature of the plates was 200° C. and thereafter they were tempered for 3 hours at 160° C.

The coatings thus obtained exhibited an Erichsen-depth of 2 mm. and a grid-cut of Grade 2 to 3.

The preceding specific embodiments are illustrative of the practice of the invention. It is to be understood, however, that other expedients known to those skilled in the art may be employed without departing from the spirit of the invention.

I claim:

1. A resinous reaction product containing about 4% to 11% by weight of epoxide oxygen, based on triglycidyl isocyanurate consisting essentially of a reaction product of a reaction effected at temperatures above the melting point, of crystalline triglycidyl isocyanurate having an epoxide oxygen content of at least 44% reacted first with (a) an organic compound containing more than one isocyanate group in the molecule with a molecular weight of about 800 to 3000 and free of other epoxide reacting substituents, in such a ratio that from about 1 to 15 parts by weight of isocyanate groups in said organic compound are allotted to 100 parts by weight of said crystalline triglycidyl isocyanurate and (b) reacted thereafter with a compound capable of forming polyadducts with epoxide compounds and free of isocyanate groups selected from the group consisting of aromatic diamine epoxide resin hardeners and organic polycarboxylic acid anhydride epoxide resin hardeners, in such amounts that the said reaction product contains from about 4% to 11% by weight of epoxide oxygen.

2. The resinous reaction product of claim 1 wherein said organic compound containing more than one isocyanate group in the molecule is present in such a ratio that from 2 to 10 parts by weight of isocyanate groups in said organic compound are allotted to 100 parts by weight of said crystalline triglycidyl isocyanurate.

3. A process for the preparation of the resinous reaction product of claim 1 which consists essentially of the steps of reacting crystalline triglycidyl isocyanurate having an epoxide oxygen content of at least 14% with first (a) an organic compound containing more than one isocyanate group in the molecule with a molecular weight of about 800 to 3000 and free of other epoxide reacting substituents in such a ratio that from about 1 to 15 parts by weight of isocyanate groups in said organic compound are allotted to 100 parts by weight of said crystalline triglycidyl isocyanurate and thereafter with (b) a compound capable of forming polyadducts with epoxide compounds and free of isocyanate groups selected from the group consisting of aromatic diamine epoxide resin hardeners and organic polycarboxylic acid anhydride epoxide resin hardeners, in such amounts that the said reaction product contains from about 4% to 11% by weight of epoxide oxygen, at a temperature above the melting point of the reactants and recovering said resinous reaction product containing from about 4% to 11% by weight of epoxide oxygen.

4. A hardenable epoxide resin mixture comprising the resinous reaction product of claim 1 and an epoxide resin hardener.

5. The hardenable epoxide resin mixture of claim 4, dissolved in an organic solvent.

References Cited

UNITED STATES PATENTS

| | | | |
|---|---|---|---|
| 3,409,591 | 11/1968 | Landva et al. | 260—2 X |
| 3,334,110 | 8/1967 | Schramm | 260—307 X |
| 3,337,509 | 8/1967 | Budnowski | 260—77.5 |
| 3,536,669 | 10/1970 | Kleinschmidt | 260—77.5 |

DONALD E. CZAJA, Primary Examiner

C. W. IVY, Assistant Examiner

U.S. Cl. X.R.

117—126 GE; 161—93; 260—2 E C, 30.4 EP, 831, 834, 77.5 NC